(12) United States Patent
Tajiri

(10) Patent No.: US 11,216,835 B2
(45) Date of Patent: Jan. 4, 2022

(54) INFORMATION PROCESSING APPARATUS, INFORMATION PROCESSING METHOD, AND RECORDING MEDIUM FOR CALCULATING A PRICE OF A TARGET PRODUCT USING MACHINE LEARNING BASED ON AN IMAGE OF THE TARGET PRODUCT

(71) Applicant: SONY CORPORATION, Tokyo (JP)

(72) Inventor: Takao Tajiri, Tokyo (JP)

(73) Assignee: SONY CORPORATION, Tokyo (JP)

( * ) Notice: Subject to any disclaimer, the term of this patent is extended or adjusted under 35 U.S.C. 154(b) by 106 days.

(21) Appl. No.: 16/621,419

(22) PCT Filed: May 29, 2018

(86) PCT No.: PCT/JP2018/020458
§ 371 (c)(1),
(2) Date: Dec. 11, 2019

(87) PCT Pub. No.: WO2019/008943
PCT Pub. Date: Jan. 10, 2019

(65) Prior Publication Data
US 2020/0104870 A1    Apr. 2, 2020

Related U.S. Application Data

(60) Provisional application No. 62/528,702, filed on Jul. 5, 2017.

(51) Int. Cl.
*G06Q 30/02* (2012.01)
*G06Q 30/06* (2012.01)
(Continued)

(52) U.S. Cl.
CPC ....... *G06Q 30/0206* (2013.01); *G06F 3/0484* (2013.01); *G06N 20/00* (2019.01); *G06Q 30/0643* (2013.01); *G06Q 30/0645* (2013.01)

(58) Field of Classification Search
CPC .. G06Q 30/0278; G06Q 30/06; G06Q 30/018; G06Q 30/00; G06Q 30/0283; G06Q 30/0206; G06Q 30/0611
See application file for complete search history.

(56) References Cited

U.S. PATENT DOCUMENTS

| 7,945,099 | B2 * | 5/2011 | Gokturk | G06F 16/5854 |
| | | | | 382/209 |
| 10,157,405 | B1 * | 12/2018 | Hopkins | G06Q 40/08 |

(Continued)

FOREIGN PATENT DOCUMENTS

| JP | 2003-331198 A | 11/2003 |
| JP | 2004-118446 A | 4/2004 |

(Continued)

OTHER PUBLICATIONS

Apr. 8, 2020, European Search Report issued for related EP Application No. 18828526.6.

(Continued)

*Primary Examiner* — Scott L Jarrett
(74) *Attorney, Agent, or Firm* — Paratus Law Group, PLLC

(57) ABSTRACT

There is provided an information processing apparatus, an information processing method, and a recording medium which are able to calculate a current price of a product more objectively and accurately, the information processing apparatus including a current price calculation unit calculating a current price of a target product, in which the current price calculation unit dynamically calculates the current price of the target product on the basis of an assessment rank of the target product determined, and supply/demand information regarding a transaction of a product that belongs to an assessment rank that is same as the assessment rank of the (Continued)

target product and has a product type that is same as a product type of the target product.

15 Claims, 15 Drawing Sheets

(51) Int. Cl.
*G06N 20/00* (2019.01)
*G06F 3/0484* (2013.01)

(56) References Cited

U.S. PATENT DOCUMENTS

| | | | | |
|---|---|---|---|---|
| 10,339,509 | B2* | 7/2019 | Bordeleau | H04N 5/232 |
| 10,438,174 | B2* | 10/2019 | Bowles | G06Q 30/0611 |
| 10,679,296 | B1* | 6/2020 | Devereaux | G06Q 30/0215 |
| 10,706,386 | B2* | 7/2020 | Trivelpiece | G06Q 10/087 |
| 10,796,323 | B2* | 10/2020 | Churchill | H04L 67/22 |
| 10,860,990 | B2* | 12/2020 | Bowles | G06Q 10/30 |
| 2003/0074391 | A1* | 4/2003 | Carter | G06Q 30/0202 709/200 |
| 2005/0289017 | A1* | 12/2005 | Gershom | G06Q 30/08 705/26.3 |
| 2008/0027882 | A1* | 1/2008 | Allen | G06Q 30/0283 705/400 |
| 2008/0215366 | A1* | 9/2008 | Robson | G16H 40/40 705/2 |
| 2010/0228676 | A1* | 9/2010 | Librizzi | H04M 1/0287 705/306 |
| 2013/0046611 | A1* | 2/2013 | Bowles | G06Q 10/00 705/14.37 |
| 2013/0046699 | A1* | 2/2013 | Bowles | G06Q 30/00 705/306 |
| 2015/0100504 | A1* | 4/2015 | Binion | G06Q 30/0278 705/306 |
| 2015/0112768 | A1* | 4/2015 | Klooster | G06Q 30/0206 705/7.35 |
| 2015/0206200 | A1* | 7/2015 | Edmondson | G06Q 10/30 705/306 |
| 2015/0324870 | A1* | 11/2015 | Nguyen | G01R 31/3828 705/306 |
| 2016/0012503 | A1* | 1/2016 | Fu | G06Q 30/0611 705/26.4 |
| 2016/0092849 | A1* | 3/2016 | Cirannek | H04N 5/225 705/26.4 |
| 2016/0125367 | A1* | 5/2016 | Bowles | G06Q 20/321 705/14.11 |
| 2016/0171456 | A1* | 6/2016 | Bowles | G06Q 30/0278 705/23 |
| 2016/0275460 | A1* | 9/2016 | Ploetner | G07F 7/06 |
| 2016/0284019 | A1* | 9/2016 | Bowles | G06Q 20/18 |
| 2017/0068935 | A1* | 3/2017 | Cohen | G06Q 30/012 |
| 2018/0053150 | A1* | 2/2018 | Ahsan | H04L 63/08 |
| 2019/0370837 | A1* | 12/2019 | Shamiss | G06N 20/00 |

FOREIGN PATENT DOCUMENTS

| | | |
|---|---|---|
| JP | 2006-323699 A | 11/2006 |
| JP | 6050922 B1 | 12/2016 |
| WO | WO 2009/044826 A1 | 4/2009 |
| WO | WO 2017/047779 A1 | 3/2017 |

OTHER PUBLICATIONS

Craig Lloyd, How to see an Image's EXIF Data in Windows and macOS, How-To Geek, Retrieved from: https://www.howtogeek.com/289712/how-to-see-an-images-exif-data-in-windows-and-macos/, Jan. 25, 2017, pp. 1-6.

* cited by examiner

FIG.5

| | | | | | |
|---|---|---|---|---|---|
| ALL | NEW | RANK A | RANK B | RANK C | JUNK J |

LATEST TRANSACTION PRICE 370,000 YEN

TOTAL TRANSACTIONS 36

| SELL ORDER | TRANSACTION PRICE | BUY ORDER |
|---|---|---|
| 4 | 385,000 | |
| 3 | 383,000 | |
| 1 | 380,000 | 1 |
| 2 | 375,000 | 1 |
| | 368,000 | 2 |
| 1 | 360,000 | 3 |

SDI

SELECT FREQUENCY OF USE

| APPROXIMATELY 1 TO 5 TIMES ∨ | PER | YEAR ∨ |

SELECT APPARENT CONDITION AND CONDITIONS OF PARTS SUCH AS LENS

MIRROR BODY SCRATCH·DENT   NONE ∨

LENS SCRATCH·HAZE   NONE ∨

DISTANCE·ZOOM·APERTURE RING   NONE ∨

SELECT STORAGE LOCATION

⦿ MOISTURE-PROOF CABINET   ○ OTHERS

SELECT MALFUNCTIONAL FUNCTION OR OPERATION

 AUTOFOCUS   ☐ SWITCH   ☐ FOCUS

ACCESSORIES: SELECT MISSING PARTS

 BOX   ☐ MANUAL   ☐ WARRANTY

☐ FRONT CAP   ☐ REAR CAP   ☐ LENS HOOD

RENTAL TRANSACTION VENDING ORDER RECEPTION

SOOMMY
RRXX1100

DESIRED RENTAL PRICE  2,000  YEN/DAY

☑ RENT OUT ITEM FOR TRIAL

DESIRED SELL PRICE  380,000  YEN

CONFIRM

| ALL | RANK A | RANK B | RANK C |

RANK A RENT-OUT ORDER LIST

◆ PRODUCTS RENTABLE FOR TRIAL

RENTAL PRICE/DAY  1,900 YEN
◆ DESIRED RENTAL PRICE  390,000 YEN
MR./MS. H
👤 8  ( ⊞ 9  ⊟ 1 )

SEE DETAILS OF ITEM

RENTAL PRICE/DAY  2,000 YEN

MR./MS. I
👤 8  ( ⊞ 9  ⊟ 1 )

SEE DETAILS OF ITEM

- PRODUCT NAME
  SOOMMY RRXX1100

- TRANSACTION TYPE
  ☑ BUY AFTER RENAL
  ☐ ONLY RENAL

RENTAL PERIOD
  [ ▦ ] SELECT START DATE  FROM
  [ ▦ ] SELECT END DATE    TO

- PRODUCT ASSESSMENT RANK
  ☐ NEW
  ☑ RANK A
  ☑ RANK B
  ☑ RANK C
  ☐ JUNK

- DESIRED TRANSACTION PRICE RANGE
  [          ] YEN  ◀ ▶  FROM
  [          ] YEN  ◀ ▶  TO

FIG. 12
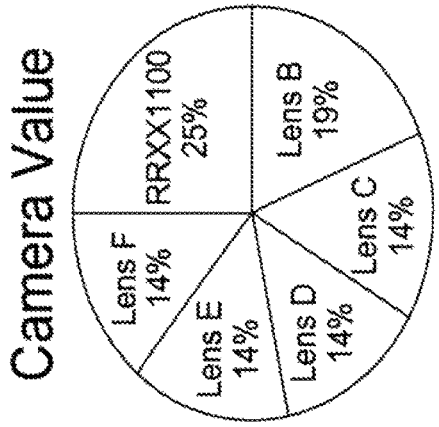
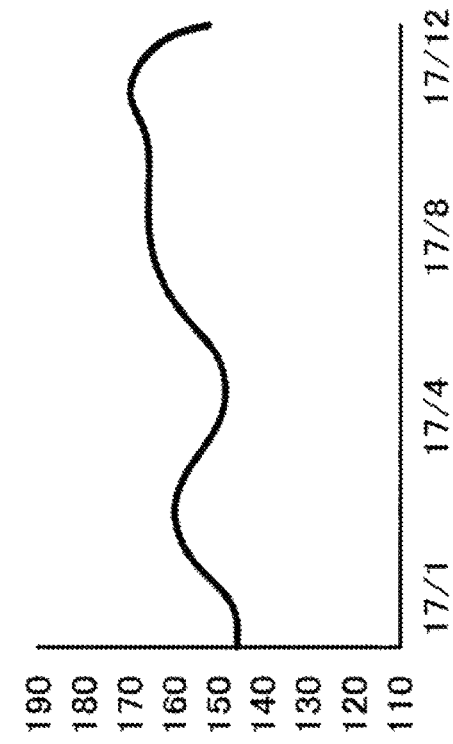

INFORMATION PROCESSING APPARATUS, INFORMATION PROCESSING METHOD, AND RECORDING MEDIUM FOR CALCULATING A PRICE OF A TARGET PRODUCT USING MACHINE LEARNING BASED ON AN IMAGE OF THE TARGET PRODUCT

CROSS REFERENCE TO PRIOR APPLICATION

This application is a National Stage Patent Application of PCT International Patent Application No. PCT/JP2018/020458 (filed on May 29, 2018) under 35 U.S.C. § 371, which claims priority to U.S. Provisional Patent Application No. 62/528,702 (filed on Jul. 5, 2017), which are all hereby incorporated by reference in their entirety.

TECHNICAL FIELD

The present disclosure relates to an information processing apparatus, an information processing method, and a recording medium.

BACKGROUND ART

In recent years, systems for mediating product transactions between individuals have become popular. Further, in the systems as described above, many technologies for enhancing the convenience of users have been proposed. For example, PTL 1 discloses a sales support method that provides, to a buyer, information regarding objects for sale satisfying selling conditions that meet buying conditions input by the buyer, together with additional assessment data based on assessment by an assessor.

CITATION LIST

Patent Literature

[PTL 1]
Japanese Patent Laid-open No. 2004-118446

SUMMARY

Technical Problem

However, with the sales support method described in PTL 1, a transaction price of a product is determined on the basis of buying conditions input by a buyer and selling conditions input by a seller, and an assessment result is not reflected in the transaction price. Thus, with the sales support method described in PTL 1, it is difficult to determine whether or not a transaction price of a product is proper.

In view of this, the present disclosure proposes novel and enhanced information processing apparatus, information processing method, and recording medium that enable more objective and accurate calculation of current prices of products.

Solution to Problem

According to the present disclosure, there is provided an information processing apparatus including a current price calculation unit calculating a current price of a target product, in which the current price calculation unit dynamically calculates the current price of the target product on the basis of an assessment rank of the target product determined, and supply/demand information regarding a transaction of a product that belongs to an assessment rank that is same as the assessment rank of the target product and has a product type that is same as a product type of the target product.

Further, according to the present disclosure, there is provided an information processing method including calculating, by a processor, a current price of a target product, in which the calculating a current price includes dynamically calculating the current price of the target product on the basis of an assessment rank of the target product determined, and supply/demand information regarding a transaction of a product that belongs to an assessment rank that is same as the assessment rank of the target product and has a product type that is same as a product type of the target product.

Further, according to the present disclosure, there is provided a recording medium having recorded thereon a program for causing a computer to function as an information processing apparatus, the information processing apparatus including a current price calculation unit calculating a current price of a target product, in which the current price calculation unit dynamically calculates the current price of the target product on the basis of an assessment rank of the target product determined, and supply/demand information regarding a transaction of a product that belongs to an assessment rank that is same as the assessment rank of the target product and has a product type that is same as a product type of the target product.

Advantageous Effect of Invention

As described above, according to the present disclosure, a current price of a product can be calculated more accurately.

Note that the above-mentioned effect is not necessarily limited, and any effect described herein or other effects that can be grasped from the present specification may be provided in addition to the above-mentioned effect disclosed in the present specification or instead of the above-mentioned effect.

BRIEF DESCRIPTION OF DRAWINGS

FIG. 5 is a diagram illustrating an example of a case where supply/demand information according to the embodiment is displayed in a board form.

FIG. 6 is an example of a screen for input of the usage status of a target product according to the embodiment.

FIG. 8 is an example of a screen for displaying detailed information regarding a sell order according to the embodiment.

FIG. 10 is an example of a screen for input of a rent-out order according to the embodiment.

FIG. 11 is an example of a screen that allows a renter to search for a product according to the embodiment.

FIG. 12 is an example of a screen for displaying statistics information regarding a current price according to the embodiment.

DESCRIPTION OF EMBODIMENT

Figure 1:
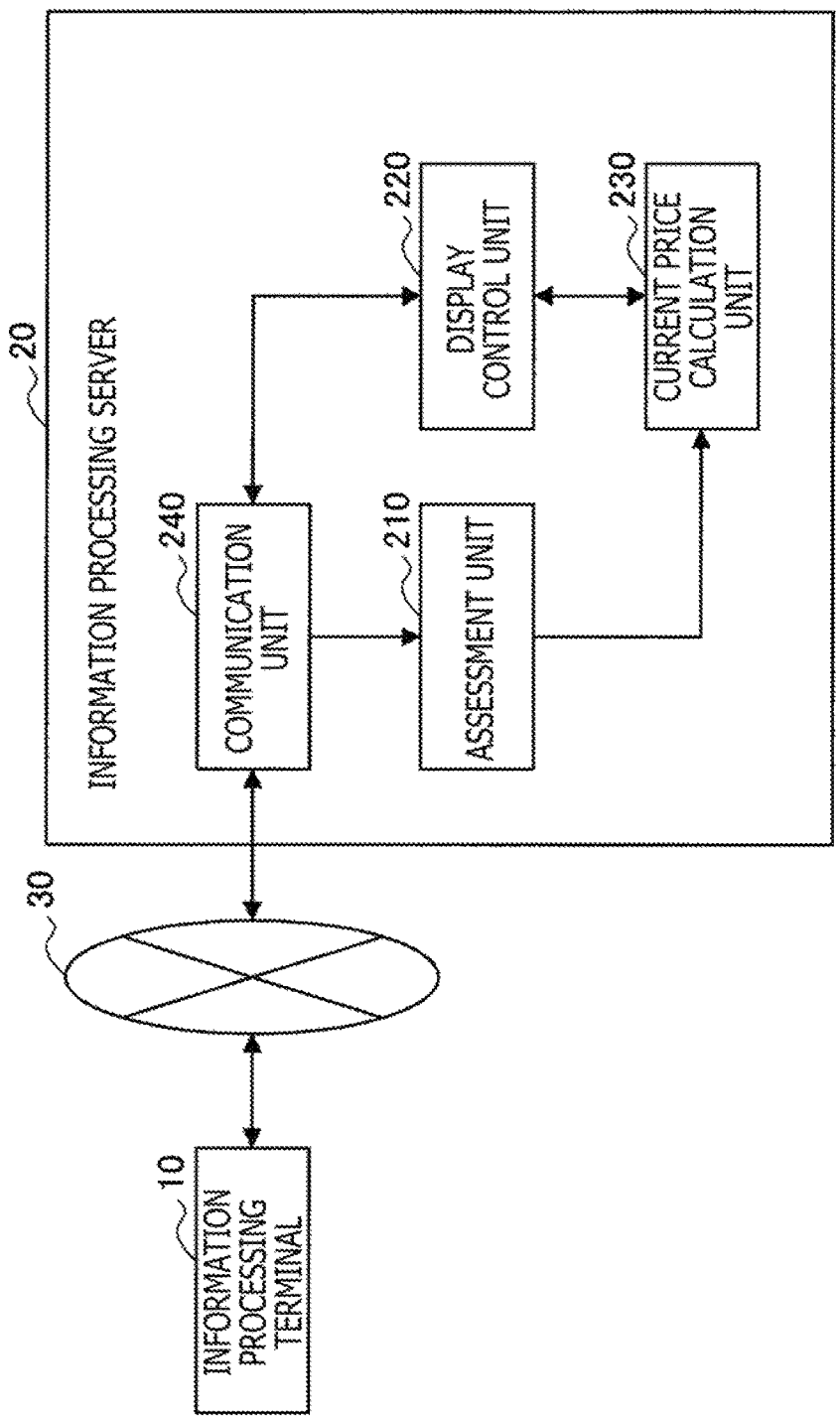
FIG. 1 is a block diagram illustrating an example of the configuration of an information processing system according to one embodiment of the present disclosure.

Now, a preferred embodiment of the present disclosure is described below in detail with reference to the attached drawings. Note that, in the present specification and the drawings, components having substantially the same functional configurations are denoted by the same reference symbols, so that overlapped description is omitted.

Note that the following items are described in order.
1. Embodiment
1.1. Background
1.2. Configuration Example
1.3. Details of Current Price Calculation
1.4. Example of User Interface
2. Hardware Configuration Example
3. Conclusion 1. Embodiment <<1.1. Background>>

In recent years, various ways for asset management have drawn attention. Here, things that are recognized as the assets described above generally include, for example, cash, financial products such as securities, cars, and real estates.

Meanwhile, some individuals spend a lot of money on cameras, musical instruments, watches, or the like, for the purpose of their hobby use or collection. In general, however, such articles are hardly regarded as having asset values in the current situation.

Further, even in a case where such articles are recognized as having asset values, it is quite difficult for individuals to appraise the asset values in question with high accuracy. In general, for example, an asset value of a camera is considered as being greatly affected by whether the camera has a problem in photographing or not.

However, for example, the following case is assumed: even though an owner of a camera assesses that the camera has no problem in photographing, a professional assessor or an expert determines that a lens has scratches or fungus to assess the camera at a lower assessed value.

Thus, for example, in a product transaction between individuals like the one as described above in which a vendor of a product generally assesses the condition and quality of the product by him or herself to determine a transaction price, in a case where the vendor and a transaction partner have different assessment criteria, the two may have troubles after the transaction has been complete, for example.

Thus, particularly in transactions between individuals, it is important to assess products more objectively and accurately.

Further, a price of an article can generally be determined on the basis of supply and demand in the market. Specifically, when the supply in the market increases, the price of the article drops. When the demand reduces, conversely, the price of the article rises. Further, when the demand in the market increases, the price of the article rises. When the demand reduces, conversely, the price of the article drops.

The relationship between supply and demand as described above can be an important indicator for determining transaction prices also in transactions between individuals. In reality, however, in many systems that support transactions between individuals, a supply-demand balance is not accurately grasped and the balance in question is not accurately reflected in transaction prices of products.

Technical ideas according to the present disclosure have been conceived in the light of the above-mentioned points, and enable more objective and accurate calculation of current prices of products in transactions between individuals. To achieve this, an information processing server 20 that achieves an information processing method according to one embodiment of the present disclosure includes a current price calculation unit 230 calculating a current price of a target product.

Further, as one of features, the current price calculation unit 230 according to one embodiment of the present disclosure dynamically calculates the current price of the target product on the basis of an assessment rank of the target product determined, and supply/demand information regarding a transaction of a product that belongs to an assessment rank that is the same as the assessment rank of the target product in question and has a product type that is the same as a product type of the target product in question.

Specifically, with the information processing server 20 according to one embodiment of the present disclosure, a current price (market value) can be calculated more objectively and accurately in consideration of a supply-demand balance for each assessment rank of products, independently of whether a vendor is knowledgeable or not.

Further, with the above-mentioned function of the information processing server 20 according to one embodiment of the present disclosure, an article that is owned for the purpose of hobbies or collection can have liquidity, so that an asset value of the article in question can be clarified.

Features of the information processing server 20 according to one embodiment of the present disclosure and effects that the features in question provide are described below in detail.

<<1.2. Configuration Example>>

Next, an example of the configuration of an information processing system according to one embodiment of the present disclosure is described. FIG. 1 is a block diagram illustrating an example of the configuration of the information processing system according to the present embodiment. With reference to FIG. 1, the information processing system according to the present embodiment includes an information processing terminal 10 and an information processing server 20. Further, the information processing terminal 10 and the information processing server 20 are connected to each other via a network 30 in a communicable manner.

(Information Processing Terminal 10)

The information processing terminal 10 according to the present embodiment is an information processing apparatus which displays, under control by the information processing server 20, a user interface for product transactions. A user can input a buy order or sell order of a product through the user interface, to thereby buy or sell the product.

The information processing terminal 10 according to the present embodiment may be a PC (Personal Computer), a smartphone, a tablet, or a cell phone that the user owns, for example.

(Information Processing Server 20)

The information processing server 20 according to the present embodiment is an information processing apparatus which determines an assessment rank of a target product, and dynamically calculate a current price of the target product on the basis of supply/demand information regarding a transaction of a product that belongs to an assessment rank that is the same as the assessment rank of the target product in question and has a product type that is the same as a product type of the product in question.

Further, the information processing server 20 according to the present embodiment may control a user interface for product transactions based on the product type and the assessment rank.

(Network 30)

The network 30 functions to connect the information processing terminal 10 and the information processing server 20 to each other. The network 30 may include public networks such as the Internet, telephone networks, and satellite communication networks, various LANs (Local Area Networks) including Ethernet (registered trademark), and WANs (Wide Area Networks), for example. Further, the network 30 may include private networks such as IP-VPNs (Internet Protocol-Virtual Private Networks), for example. Further, the network 30 may include wireless communication networks such as Wi-Fi (registered trademark) and Bluetooth (registered trademark), for example.

Subsequently, an example of the functional configuration of the information processing server 20 according to the present embodiment is described in detail with reference to FIG. 1. With reference to FIG. 1, the information processing server 20 according to the present embodiment includes an assessment unit 210, a display control unit 220, a current price calculation unit 230, and a communication unit 240.

(Assessment Unit 210)

The assessment unit 210 according to the present embodiment functions to determine an assessment rank of a target product. The assessment unit 210 according to the present embodiment determines, for example, whether the functionality, quality, and storage conditions of a target product, which is supposed by a vendor to be assessed, are good or bad, and determines, from a plurality of assessment ranks defined in advance, an assessment rank to which the target product in question corresponds. The details of the function of the assessment unit 210 according to the present embodiment are described later.

(Display Control Unit 220)

The display control unit 220 according to the present embodiment functions to control the user interface that supports product transactions between individuals, for example. Here, the "transaction" described above includes sales transactions of products and rental transactions of products.

The display control unit 220 according to the present embodiment may control the user interface that enables, in particular, product transactions based on the product type and the assessment rank determined by the assessment unit 210. At this time, the display control unit 220 according to the present embodiment, as one of features, visualizes supply/demand information regarding a product by the product type, the assessment rank, or the transaction type, and displays the supply/demand information on the user interface. Examples of the user interface that the display control unit 220 according to the present embodiment controls are described later.

(Current Price Calculation Unit 230)

The current price calculation unit 230 according to the present embodiment functions to calculate a current price (market value) of a target product. At this time, the current price calculation unit 230 according to the present embodiment, as one of the features, dynamically calculates the current price of the target product on the basis of an assessment rank of the target product assessed by the assessment unit 210, and supply/demand information regarding a transaction of a product that belongs to an assessment rank that is the same as the assessment rank of the target product in question and has a product type that is the same as a product type of the target product in question.

Here, the "supply/demand information" described above may include sell order information and buy order information regarding products, for example. Specifically, the current price calculation unit 230 according to the present embodiment can dynamically calculate a current price of a product for sale in consideration of a supply-demand balance for an assessment rank of the product in question.

Further, the "supply/demand information" described above may include rent-out order information and rent order information regarding products, for example. Specifically, the current price calculation unit 230 according to the present embodiment can dynamically calculate, a current price of a rental product in consideration of a supply-demand balance for an assessment rank of the product in question. Meanwhile, the current price calculation unit 230 may calculate a predetermined percentage of a calculated current sales price of a target product as a current rental price of the target product.

With the above-mentioned function of the current price calculation unit 230 according to the present embodiment, in a transaction between individuals, a current price of an article can be calculated more objectively and accurately, and the article can have liquidity, so that an asset value of the article in question can be clarified.

Note that the target product that is subjected to the current price calculation according to the present embodiment may include various articles that are owned for the purpose of hobbies or collection. The articles in question widely include articles in association with art or sports, clothing, and knick-knacks, for example.

Further, the target product according to the present embodiment may specifically be a product which generates or reproduces content. Here, the "content" described above may include an image, sound, or character string, or a combination thereof, and may be anything that is generated by creative activities of human being.

Examples of the product which generates or reproduces content include cameras, lenses, musical instruments, and audio instruments (amplifiers, speakers, and microphones, for example). The functionality of such a product is greatly affected by the usage conditions or storage conditions thereof, and it is difficult to determine the functionality in question from the appearance. The assessment method according to the present embodiment is therefore particularly effective for such a product. The details of the function of the current price calculation unit 230 according to the present embodiment are described later.

(Communication Unit 240)

The communication unit 240 according to the present embodiment transmits/receives information to/from the information processing terminal 10 via the network 30. The communication unit 240 transmits, to the information processing terminal 10, a control signal for the user interface that the display control unit 220 generates, for example. Further, the communication unit 240 receives information regarding operation on the user interface from the information processing terminal 10.

The example of the functional configuration of the information processing server 20 according to the present embodiment is described in detail above. Note that the functional configuration described above with reference to FIG. 1 is merely an example, and the functional configuration of the information processing server 20 according to the present embodiment is not limited to the example. For example, the assessment unit 210, the display control unit 220, and the current price calculation unit 230 may be achieved as functions of different apparatus. The functional configuration of the information processing server 20 according to the present embodiment can be flexibly changed depending on specifications and use.

<<1.3. Details of Current Price Calculation>>

Figure 2:
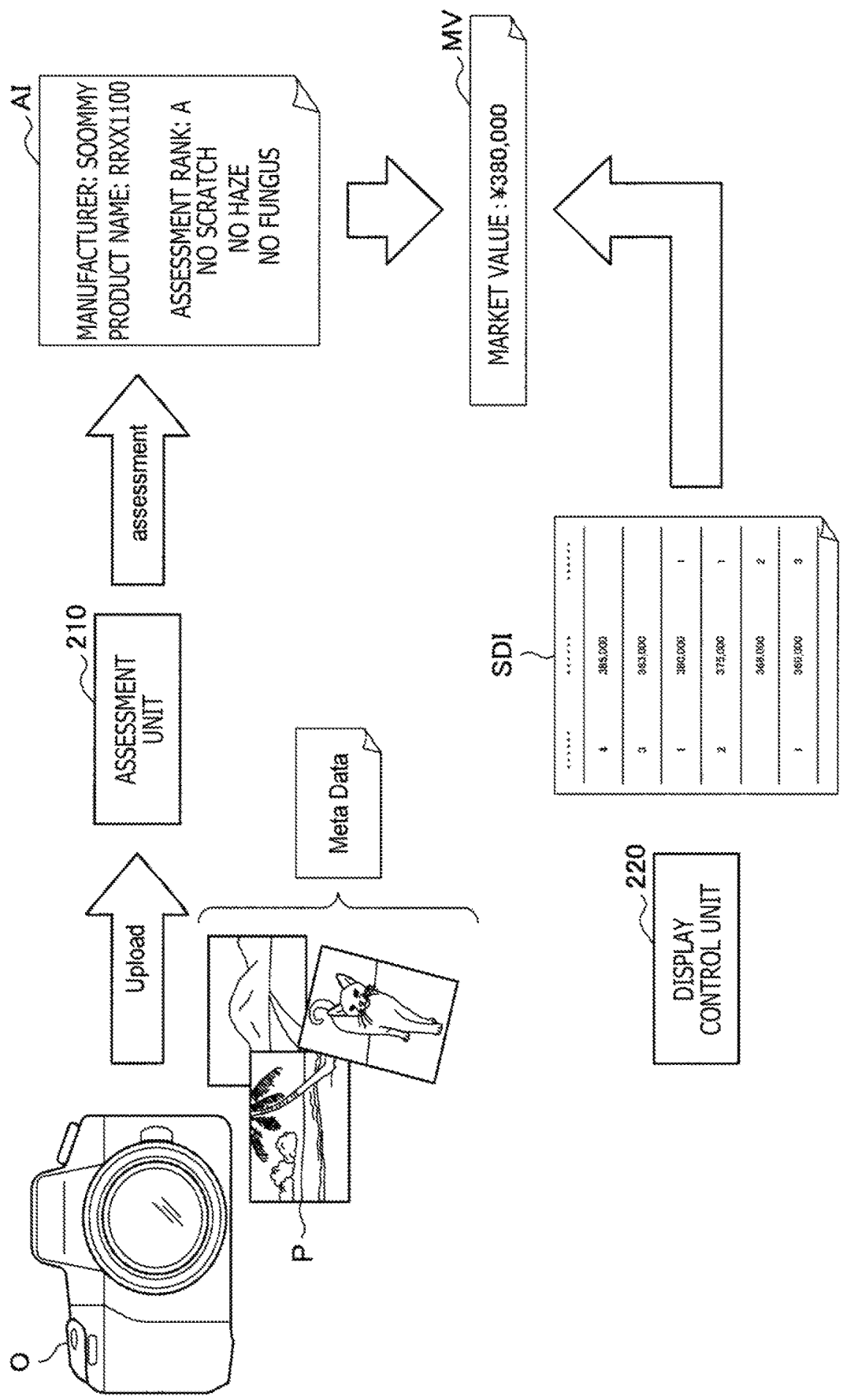
FIG. 2 is a diagram illustrating assessment rank determination and current price calculation according to the embodiment.

Next, the assessment rank determination and current price calculation according to the present embodiment are described in detail. As described above, the current price calculation unit 230 according to the present embodiment can dynamically calculate a current price of a target product on the basis of an assessment rank determined by the assessment unit 210 and supply/demand information for each assessment rank. FIG. 2 is a diagram illustrating the assessment rank determination and current price calculation according to the present embodiment. Note that, in the example illustrated in FIG. 2, the target product according to the present embodiment includes a camera and a lens. FIG. 2 illustrates an example of a case where the assessment unit 210 determines an assessment rank of the camera and the lens.

In the upper part of FIG. 2, a flow along which the assessment unit 210 according to the present embodiment determines the assessment rank of the camera and the lens is schematically illustrated. At this time, a user who is a vendor of a target product O that includes the camera and the lens first uploads an image P taken with the use of the target product O on the information processing server 20 through the information processing terminal 10.

In this case, the assessment unit 210 according to the present embodiment can determine an assessment rank of the target product O on the basis of the uploaded image P. Specifically, the assessment unit 210 according to the present embodiment first specifies a product type (model or model number, for example) of the target product O on the basis of meta data included in the image P.

The meta data is recorded on the image P in Exif (Exchangeable image file format), for example. The assessment unit 210 according to the present embodiment can extract a manufacturer name or a model name included as the meta data to specify the product type of the target product O.

Further, the assessment unit 210 according to the present embodiment may determine, with the image P being an input, the assessment rank of the target product O on the basis of a learned model generated by using a machine learning algorithm. As the machine learning algorithm, for example, supervised learning through deep learning is given.

Specifically, the assessment unit 210 (or another learning apparatus) may perform supervised learning by using, in learning, an image taken with the use of the camera and the lens, and labels that indicate whether or not the camera or lens in question has scratches, fungus, haze, or balsam cemented lens separation and the degrees thereof as supervised data. The assessment unit 210 according to the present embodiment can estimate, by using the learned model generated through the above-mentioned leaning, whether or not the target product O, with which the input image P has been taken, has scratches, fungus, haze, or balsam cemented lens separation and the degrees thereof, to thereby determine the assessment rank of the target product O on the basis of the result of the estimation in question.

Alternatively, the assessment unit 210 according to the present embodiment may determine the assessment rank of the target product O by using a learned model generated through supervised learning to which the assessment ranks are directly applied as labels.

In the upper right part of FIG. 2, an example of assessment information AI including an assessment rank that the assessment unit 210 has determined as described above is illustrated. With the above-mentioned function of the assessment unit 210 according to the present embodiment, an assessment rank of a target product including a camera and a lens can be automatically determined objectively and accurately on the basis of whether the target product has scratches, fungus, or haze and the degrees thereof, which are estimated from an image.

Further, in the lower part of FIG. 2, an example of supply/demand information SDI that the display control unit 220 has generated from order information input to the user interface. The display control unit 220 can generate, by the product type and the assessment rank, the supply/demand information SDI including buy order information and sell order information or rent-out order information and rent order information that each user has input by using the user interface, for example, and output the supply/demand information SDI.

At this time, the current price calculation unit 230 according to the present embodiment can acquire the supply/demand information SDI corresponding to the assessment rank of the target product P determined by the assessment unit 210, to thereby calculate a current price (market value) MV of the target product O on the basis of the supply/demand information SDI.

With the above-mentioned function of the current price calculation unit 230 according to the present embodiment, a current price can be calculated more objectively and accurately in consideration of a supply-demand balance for each assessment rank of products, independently of whether a vendor is knowledgeable or not.

Further, with the above-mentioned function of the current price calculation unit 230 according to the present embodiment, an article that is owned for the purpose of hobbies or collection can have liquidity so that an asset value of the article in question can be clarified. In addition, when an asset value of an article is clarified, for example, a loan can be made with the article in question serving as security, with the result that asset management with a higher degree of freedom can be achieved.

Figure 3:
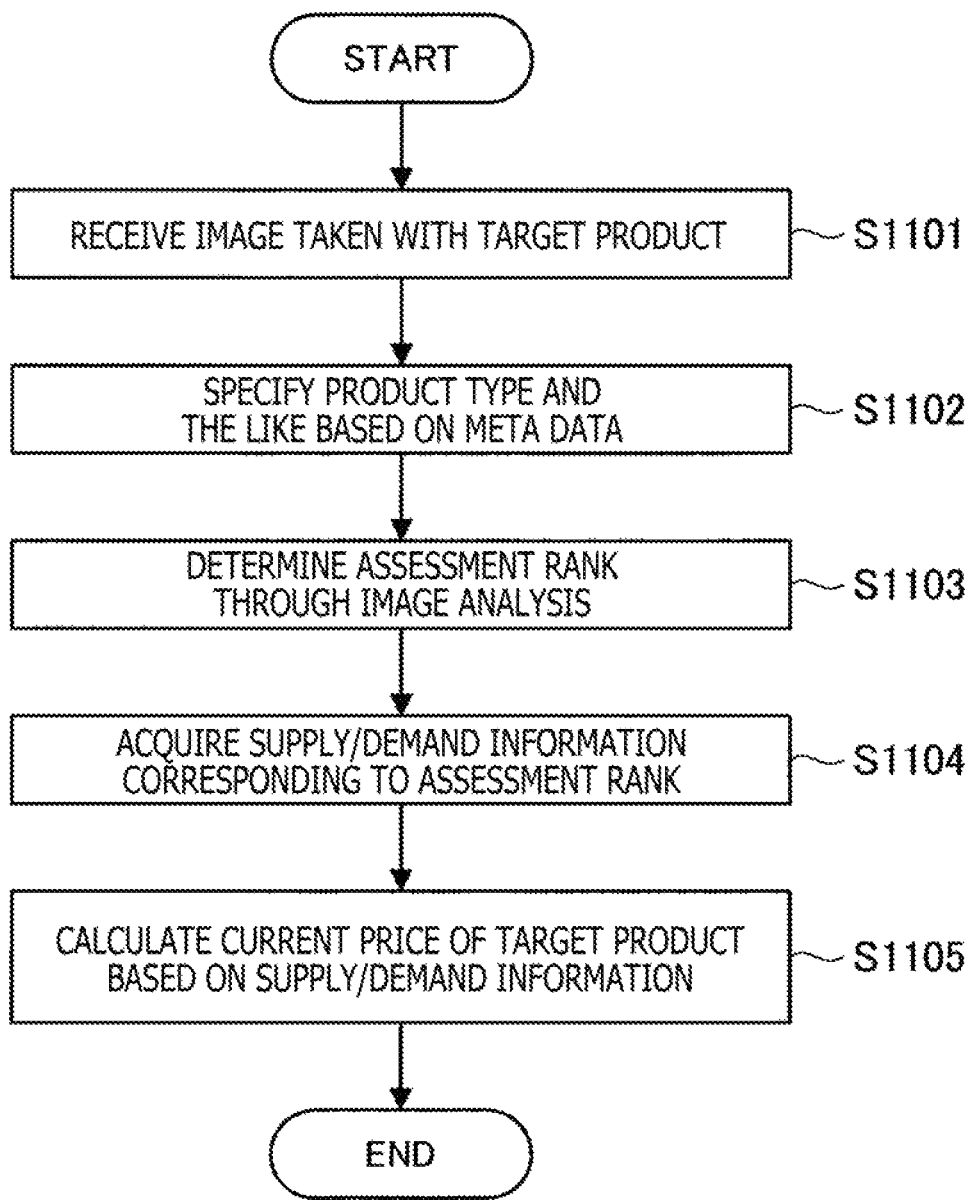
FIG. 3 is a flow chart illustrating the flow of the assessment rank determination and current price calculation according to the embodiment.

Subsequently, the flow of the assessment rank determination and current price calculation by the information processing server 20 according to the present embodiment is described in detail. FIG. 3 is a flow chart illustrating the flow of the assessment rank determination and current price calculation according to the present embodiment. Note that, in an example of a case described below with reference to FIG. 3, the target product according to the present embodiment includes a camera and a lens.

With reference to FIG. 3, the communication unit 240 first receives an image taken with the use of a target product from the information processing terminal 10 via the network 30 (S1101).

Next, the assessment unit 210 specifies, for example, the product type and manufacturer of the target product on the basis of meta data included in the image received in Step S1101 (S1102).

Subsequently, the assessment unit 210 analyzes the image received in Step S1101 to determine an assessment rank of the target product (S1103).

Next, the current price calculation unit 230 acquires, from the display control unit 220, supply/demand information corresponding to the product type and assessment rank of the target product on the basis of the product type specified in Step S1102 and the assessment rank determined in Step S1103 (S1104).

Subsequently, the current price calculation unit 230 calculates a current price of the target product on the basis of the supply/demand information acquired in Step S1104 (S1105).

<<1.4. Example of User Interface>>

Next, examples of the user interface that supports transactions based on current prices of products that are calculated as described above are described in detail. The display control unit 220 according to the present embodiment may control the user interface that enables product transactions based on the product type and the assessment rank.

Figure 4:
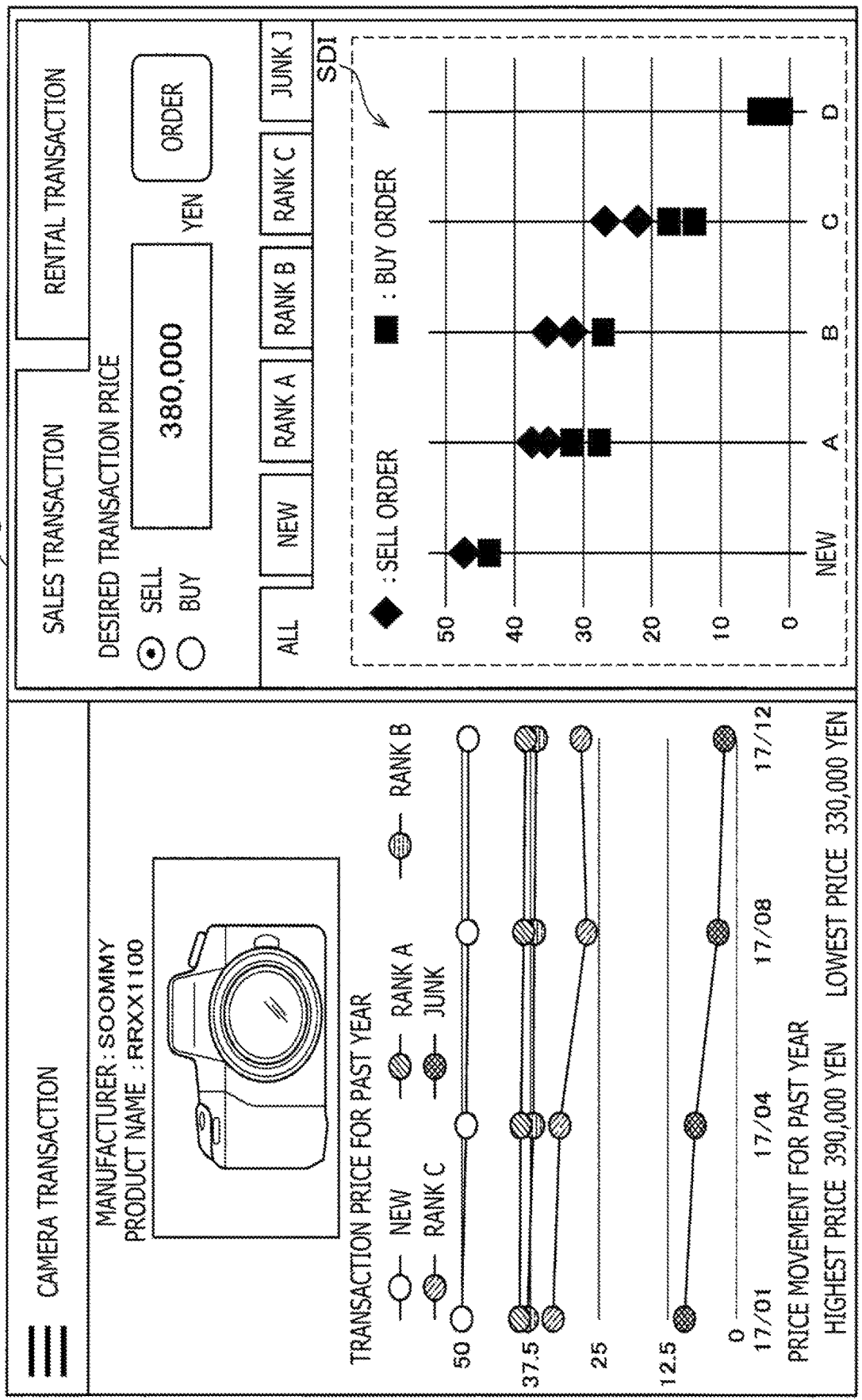
FIG. 4 is an example of a screen for input of a sell order or buy order according to the embodiment.

FIG. 4 is an example of a screen SC1 for input of a sell order or buy order according to the present embodiment. A seller (vendor) can access the screen SC1 through the assessment rank determination and current price calculation of a product described above, for example. Further, a buyer may access the screen SC1 by searching for a manufacturer name or a product name (product type name), for example.

With reference to FIG. 4, on the screen SC1, as illustrated in the upper left part, information regarding a product that is a target of a sales transaction may be displayed. Examples of the information in question include a manufacturer name of the product, a product name, and an image representing the appearance of the product.

Further, on the screen SC1, as illustrated in the lower left part, for example, there may be displayed statistics information such as a change in transaction price of each assessment rank in a predetermined period, and the highest transaction price and the lowest transaction price in the predetermined period.

Further, on the screen SC1, as illustrated in the upper right part, a field in which a desired transaction price is input is placed, for example. Note that, in a case where a sell order is input, a current price of a product calculated by the current price calculation unit 230 may be input to the field by default.

At this time, the seller can refer to the supply/demand information SDI as illustrated in the lower right part in addition to the current price calculated by the current price calculation unit 230, to thereby input a desired transaction price of the product to which the sell order is made. Note that FIG. 4 illustrates an example of a case where the supply/demand information SDI is displayed as a graph in which desired transaction prices of sell orders and buy orders are plotted by the assessment rank.

Meanwhile, the supply/demand information SDI according to the present embodiment is not limited to the graph as illustrated in FIG. 4, and may be displayed in a board form that indicates the number of sell orders and buy orders on the basis of a desired transaction price. FIG. 5 is a diagram illustrating an example of a case where the supply/demand information according to the present embodiment is displayed in a board form.

A seller or a buyer can click a tab corresponding to a given assessment rank, thereby accessing the supply/demand information SDI displayed in a board form. Note that FIG. 4 and FIG. 5 illustrate a case where the assessment rank according to the present embodiment includes A to C and J (junk) in addition to new.

The display control unit 220 according to the present embodiment can dynamically control the display of the SDI on the basis of a desired transaction price of a sell order or a buy order input through the screen SC1 illustrated in FIG. 4, for example.

With the above-mentioned function of the display control unit 220 according to the present embodiment, a seller or a buyer can input a more realistic or strategic desired transaction price while looking at the latest information regarding supply and demand for each assessment rank.

Note that, in the above, the case where the assessment unit 210 according to the present embodiment analyzes an image taken with the use of a target product to determine an assessment rank of the target product in question is described as a main example. However, the assessment unit 210 according to the present embodiment may determine an assessment rank of a target product on the basis of, for example, the usage status of the target product in question input by a seller (or assessor).

FIG. 6 is an example of a screen SC2 for input of the usage status of a target product according to the present embodiment. When a seller registers information regarding a target product that the seller wants to sell, the seller may input the usage status of the target product on the screen SC2 as illustrated in FIG. 6, for example.

The "usage status" described above may include information regarding a target product, for example, a frequency of use, an apparent condition, conditions of parts such as a lens, a storage location, malfunction, and accessories as illustrated in FIG. 6. At this time, the assessment unit 210 according to the present embodiment may quantify an input content in each item as described above, and calculate a score of the overall usage status on the basis of the numerical values in question and weights. The assessment unit 210 can determine an assessment rank of a target product on the basis of the calculated score.

The screens for input of sell order and buy order for each assessment rank according to the present embodiment are described above with examples.

Subsequently, a flow after an order has been input according to the present embodiment is described. When a sell order or a buy order has been input, in a case where there is an order that meets a desired transaction price, a user may immediately make a sales transaction. Meanwhile, a case where the order that meets the desired transaction price is not immediately made is also assumed.

Thus, the display control unit 220 according to the present embodiment may function to notify, in a case where an order that meets a desired transaction price of a sell order or a buy order input by the user has been made, the user that the order in question has been made.

Figure 7:
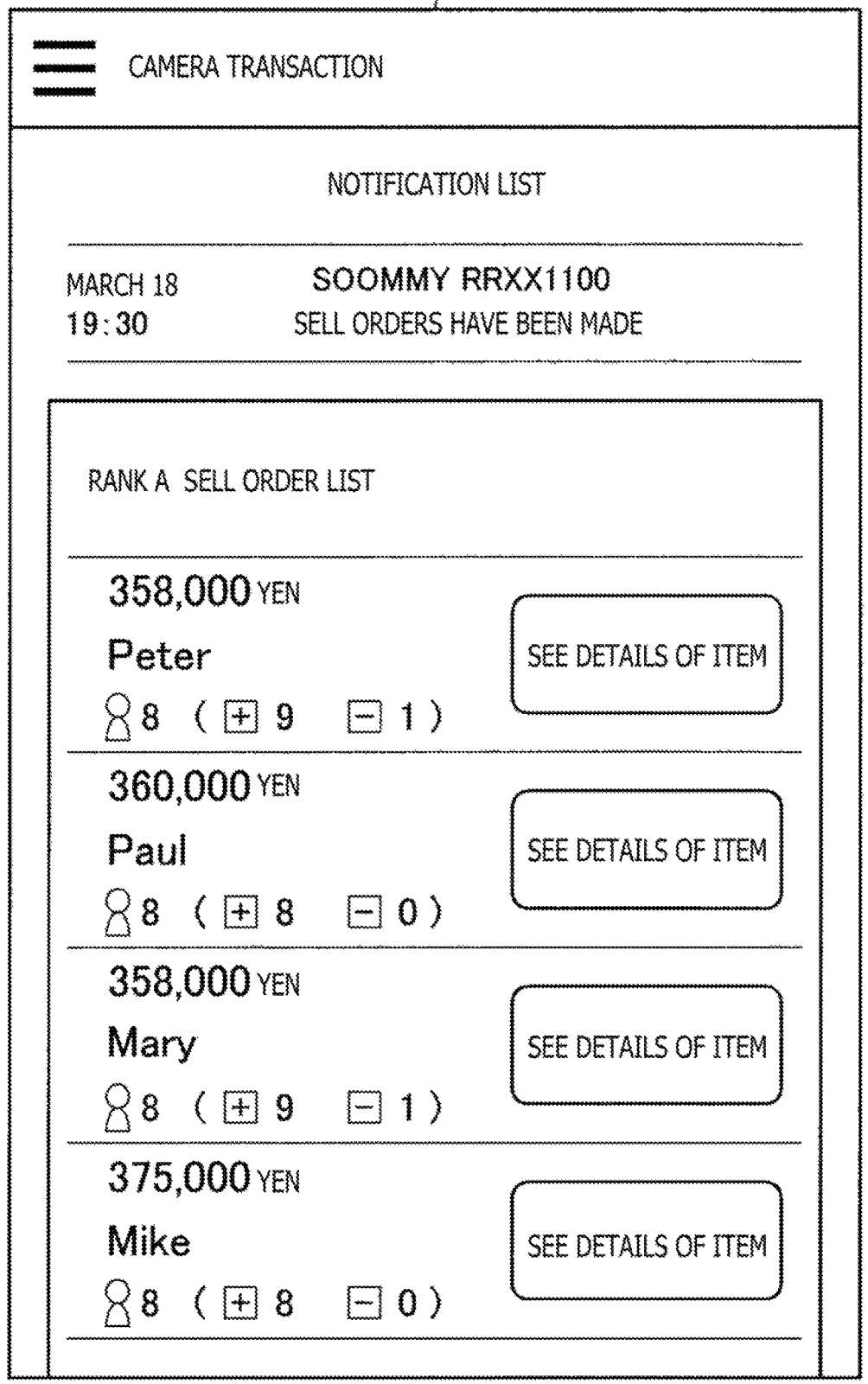
FIG. 7 is an example of a screen for notifying that an order that meets a desired transaction price has been made according to the embodiment.

FIG. 7 is an example of a screen SC3 for notifying that an order that meets a desired transaction price has been made according to the present embodiment. Note that FIG. 7 illustrates an example of the screen SC3 in a case where the display control unit 220 notifies that a sell order that meets a desired transaction price of a buy order input by a buyer has been made.

With reference to FIG. 7, on the screen SC3, in addition to a message notifying that the sell order that meets the desired transaction price has been made, sell orders that meet the desired transaction price are displayed as examples. At this time, the display control unit 220 may display, on the screen SC3, information regarding users (sellers) that have made the sell orders or desired transaction prices of the sell orders.

At this time, a user who is a buyer may select, in the list displayed on the screen SC3, a sell order in which the user has an interest, to thereby transition to a screen SC4 on which detailed information regarding the sell order in question is displayed.

Figure 8:
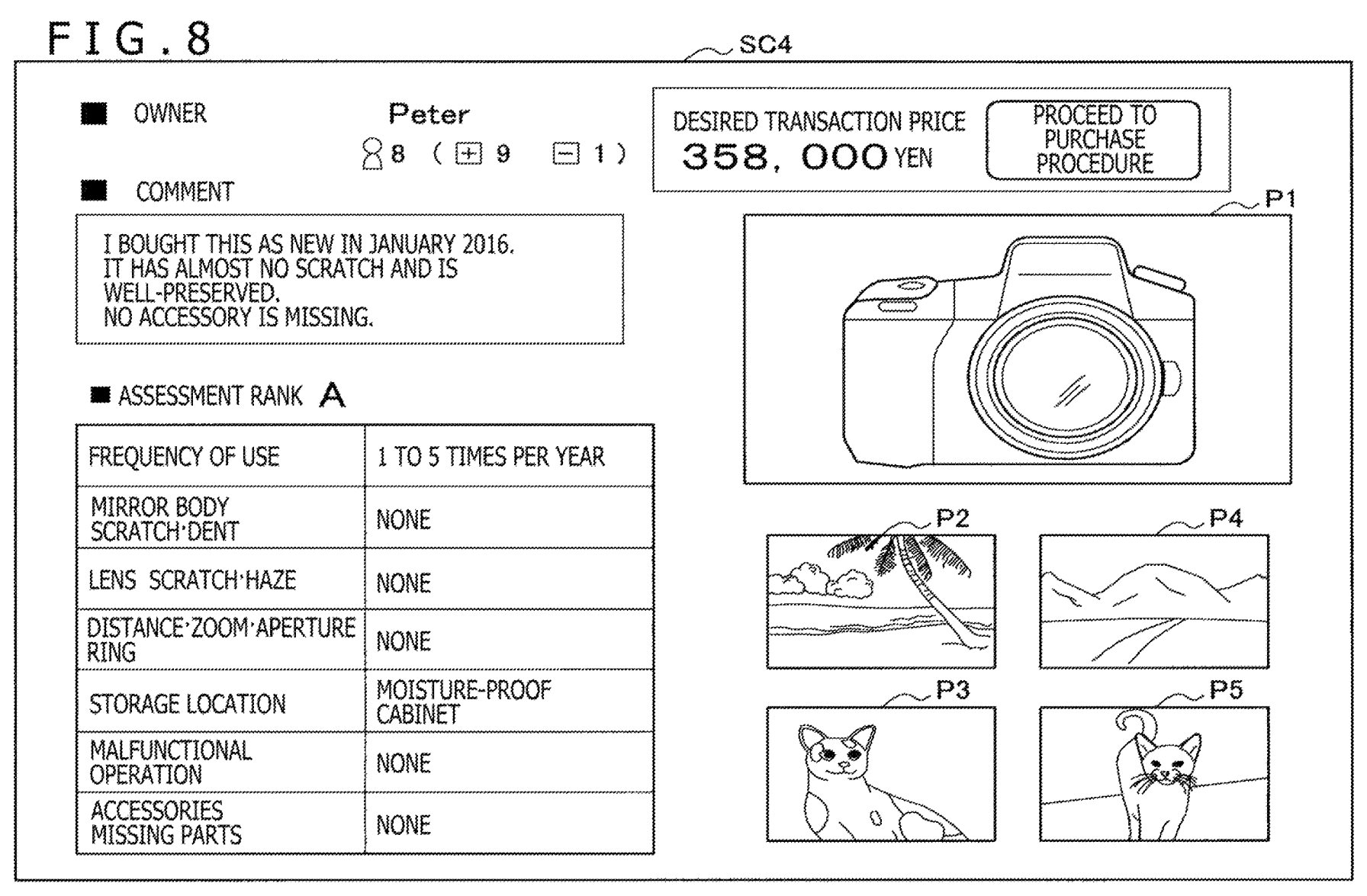

FIG. 8 is an example of the screen SC4 for displaying the detailed information regarding the sell order according to the present embodiment. On the screen SC4, for example, there are displayed the name and rating of a seller who has input the sell order, a comment about the product that the seller has input, assessment information including an assessment rank of the product, a desired transaction price, an image P1 of the appearance of the product, and images P2 to P4 taken with the use of the product.

At this time, the user who is the buyer can check the above-mentioned information displayed on the screen SC4 to grasp the details of the product, thereby determining whether or not to actually make a sales transaction.

The examples of the screens for sales transactions according to the present embodiment are described above. Note that FIG. 7 and FIG. 8 illustrate the case where the display control unit 220 displays a list of sell orders that meet a desired transaction amount and the details of the sell orders on the basis of a buy order that a user who is a buyer has input. The display control unit 220 may, however, control the display of a list of buy orders and the details thereof in a similar manner.

Next, an example of a screen for rental transactions according to the present embodiment is described. The display control unit 220 according to the present embodiment may provide, in addition to the screens for product sales transactions, screens for rental transactions as part of the user interface.

Figure 9:
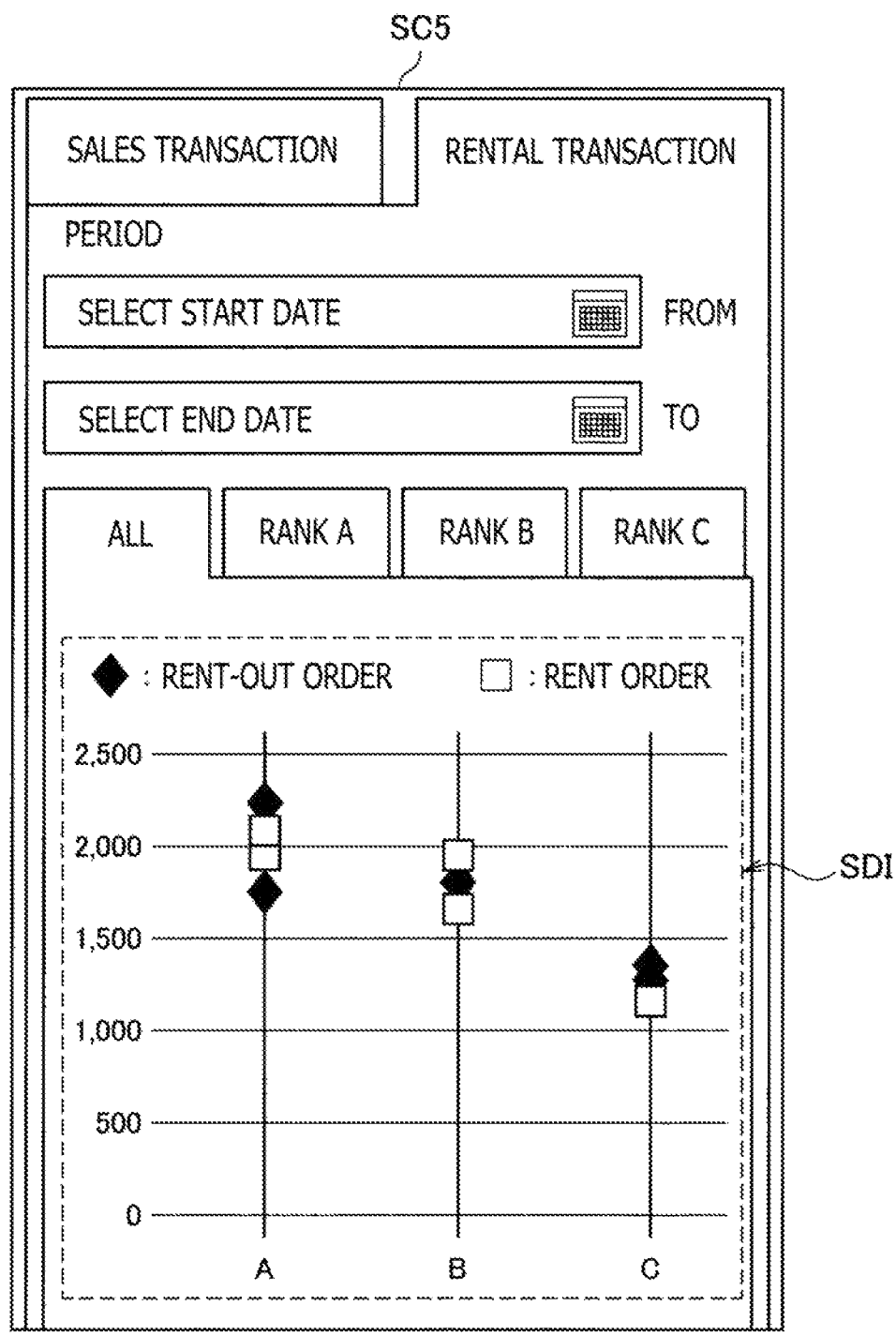
FIG. 9 is an example of a screen for displaying supply/demand information regarding rental of a product according to the embodiment.

FIG. 9 is an example of a screen SC5 for displaying supply/demand information regarding rental of a product according to the present embodiment. On the screen SC5, the display control unit 220 may display, on the basis of a period input by a user, the display supply/demand information SDI including rent-out order information and rent order information corresponding to the period in question, for example.

FIG. 9 illustrates an example of a case where the supply/demand information SDI is displayed as a graph in which desired transaction prices of rent-out orders and rent orders are plotted by the assessment rank. In this way, an owner or a renter may input a desired rental transaction amount of a product while checking the supply/demand information SDI displayed as a graph or in a board form.

Further, FIG. 10 is an example of a screen SC6 for input of a rent-out order according to the present embodiment. A user who is an owner can check the supply/demand information SDI as illustrated in FIG. 9 or a list of other rent-out orders as illustrated in the lower part of the screen SC6 of FIG. 10, to thereby input a desired rental transaction price of a product.

Further, on the user interface according to the present embodiment, rental transactions that premise that the rental transactions lead to sales transactions (hereinafter also referred to as "trial rental") may be performed. Specifically, a user may rent once a product in which the user has an interest to try the performance, and then buy the product straight away in a case where the user likes the product in question. At this time, as a transaction price, a desired selling price input by an owner by referring to a current price calculated by the current price calculation unit 230 is applied as illustrated in FIG. 10.

In this way, with the information processing server 20 according to the present embodiment, a user can rent a product at a current price for the purpose of a trial, and buy the product straight away at the current price in a case where the user likes the product in question.

With the above-mentioned function of the information processing server 20 according to the present embodiment, even in a transaction between individuals, a user can actually try a product to determine whether to buy the product or not. Concerns about expensive sales transactions can be reduced, and sales transactions can be prompted.

Next, with reference to FIG. 11, an example of a screen SC7 that allows a renter to search for a product is described. The renter according to the present embodiment may input, for example, a product name (product type), a transaction type, a rental period, an assessment rank, or a desired transaction price range as illustrated in FIG. 11, to thereby search for a rent-out order that meets the conditions. Here, the "transaction type" described above includes the above-mentioned trial rental and normal rental that does not premise sales of products.

At this time, the display control unit 220 can search for rent-out orders on the basis of the input conditions, and present, to the user, rent-out orders satisfying the conditions in question as a graph or a list illustrated in FIG. 9 or FIG. 10, for example.

The screens for rental transactions for renting out or renting products according to the present embodiment are described above with examples. Note that the display control unit 220 may notify, when an order that meets a rent-out order or a rent order input by a user has been made, the user that the order in question has been made, as in sales transactions.

Further, for example, the display control unit 220 may estimate a renter who seems to buy a product after trial rental with high possibility, and notify the renter in question or an owner of information for prompting the renter to buy the product. In a case where the display control unit 220 estimates that a renter seems to buy a rented product with high possibility on the basis of, for example, the length of a rental period, the extension of the rental period, past purchase results, the number of images taken by the renter with the use of the rented product, or positive comments about the rented product that the renter has made in a community described later, the display control unit 220 may notify an owner of the high possibility and propose a discount on a sales price.

Next, the display of statistics information regarding a current price of the present embodiment is described. The display control unit 220 according to the present embodiment may dynamically control the display of statistics information regarding a current price of a product that a user has.

FIG. 12 is an example of a screen SC8 for displaying statistics information according to the present embodiment. The display control unit 220 according to the present embodiment may dynamically calculate, for example, as illustrated in the upper right part of FIG. 12, current total values of the number of products (items) that a user has, current sales prices, and current rental prices, and display the current total values on the screen SC8. Further, the display control unit 220 may display a balance of sales transactions and rental transactions of the user on the screen SC8.

Further, the display control unit 220 may display, as illustrated in the lower right part of FIG. 12, a change in total of the current prices of the products that the user has on the screen SC8 with the use of a graph, for example.

Further, the display control unit 220 may display, for example, as illustrated in the left part of FIG. 12, the breakdown of the total current price on the screen SC8 with the use of a graph or a table.

In this way, with the display control unit 220 according to the present embodiment, the display of statistics information regarding a total of current prices of products that a user has, that is, the assets of the user can be dynamically controlled. With the above-mentioned function of the display control unit 220 according to the present embodiment, a user can clearly grasp own assets and make a plan for feature transactions.

Next, a community function according to the present embodiment is described. The display control unit 220 according to the present embodiment may control the display of the community function for prompting communication between users.

Here, the "community" described above means, for example, a place where aficionados of a specific product or manufacturer communicate with each other to exchange information, for example. A user may freely make a community or join a community on the user interface that the display control unit 220 controls.

Further, the display control unit 220 may send, on the basis of a user transaction history or a user browsing history, a notification to a user that recommends that the user join a specific community.

With the above-mentioned function of the display control unit 220 according to the present embodiment, communication between users in a community is activated, and transactions between the users are consequently expected to be prompted.

Figure 13:
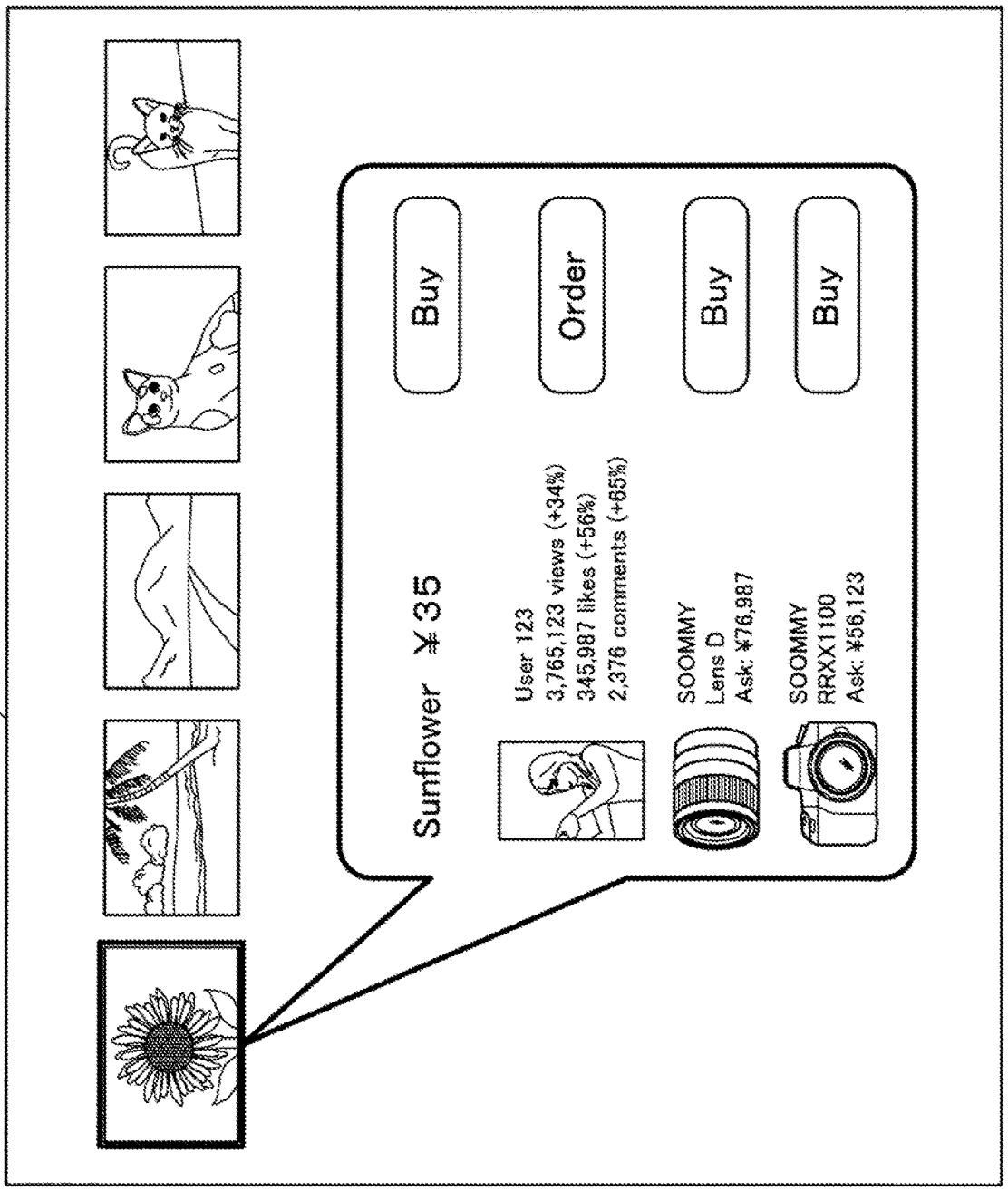
FIG. 13 is a diagram illustrating an example of communication between users according to the embodiment.

Further, the display control unit 220 according to the present embodiment may control a screen display for allowing users to communicate with each other in a place other than the community. FIG. 13 is a diagram illustrating an example of communication between users according to the present embodiment. FIG. 13 illustrates an example of a screen SC9 for displaying a list of content (images) posted in a community or on a personal page, for example, according to the present embodiment.

A user can post image content taken with the use of a product that the user has in a community to which the user belongs or on a personal page, for example. At this time, other users may select, for example, a given content to make a purchase request for the content or a photography request to the user who has posted the content, as illustrated in FIG. 13.

Further, the above-mentioned users may check information regarding the product, such as a camera or a lens, that has been used for taking the image content, and make a purchase request for the product in question, as illustrated in FIG. 13.

Figure 14:
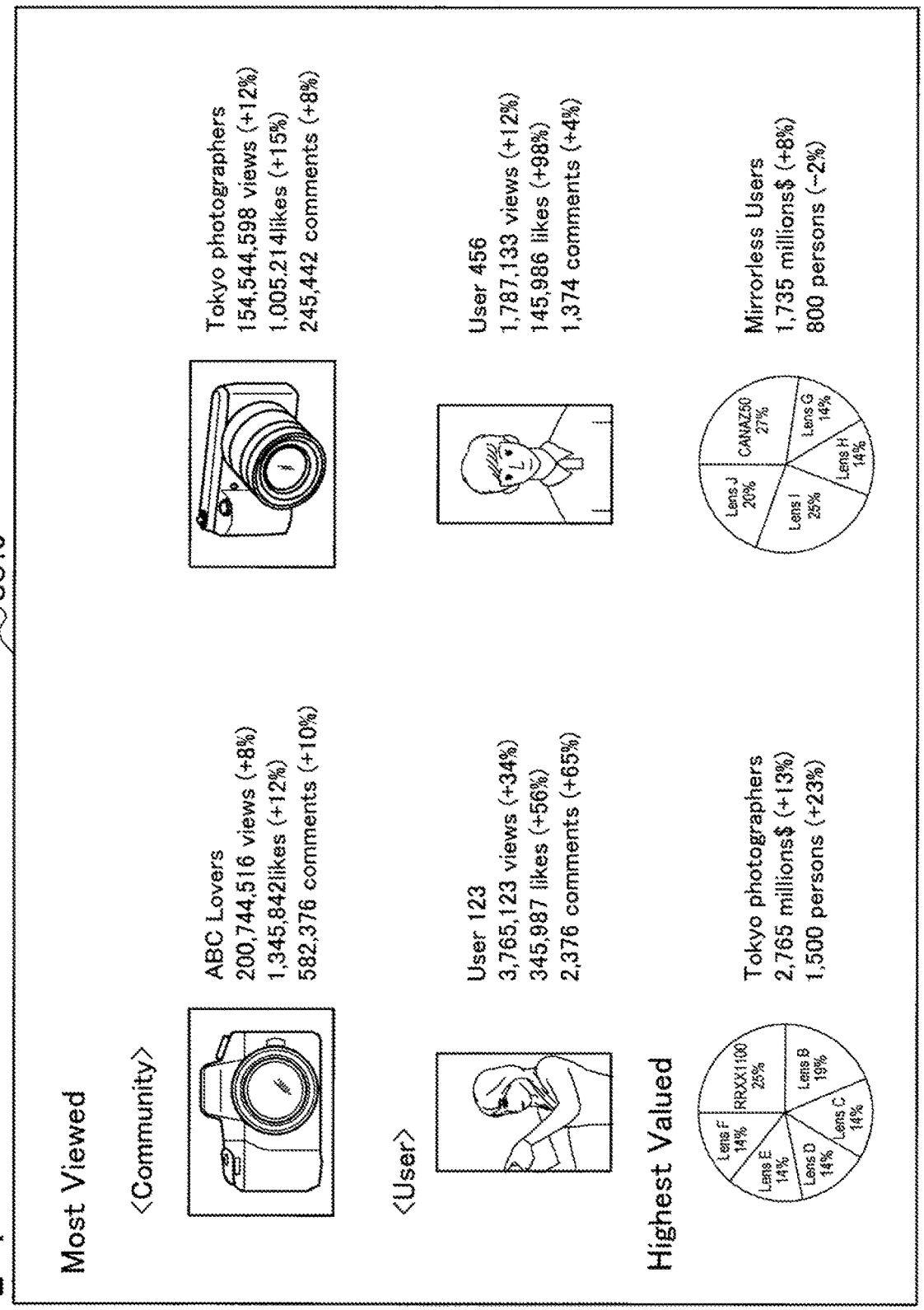
FIG. 14 is an example of a screen for displaying statistics information regarding a community, a user browsing history, and a user transaction history according to the embodiment.

Further, the display control unit 220 according to the present embodiment may control the display of statistics information regarding a community, a user browsing history, and a user transaction history. FIG. 14 is an example of a screen SC10 for displaying statistics information regarding a community, a user browsing history, and a user transaction history according to the present embodiment.

In the case of the example illustrated in FIG. 14, the display control unit 220 displays, in the upper and middle parts of the screen SC10, statistics information such as the number of views, the number of evaluations, and the number of comments that relate to community and user having many views.

Further, the display control unit 220 displays, in the lower part of the screen SC10, statistics information such as a total current price of a community having a high total current price and the number of members of the community.

In this way, with the display control unit 220 according to the present embodiment, statistics information regarding a community, a user browsing history, and a user transaction history can be dynamically displayed. Competitive consciousness between communities or between users can thus be stimulated, and product transactions can consequently be more prompted.

2. Hardware Configuration Example

Figure 15:
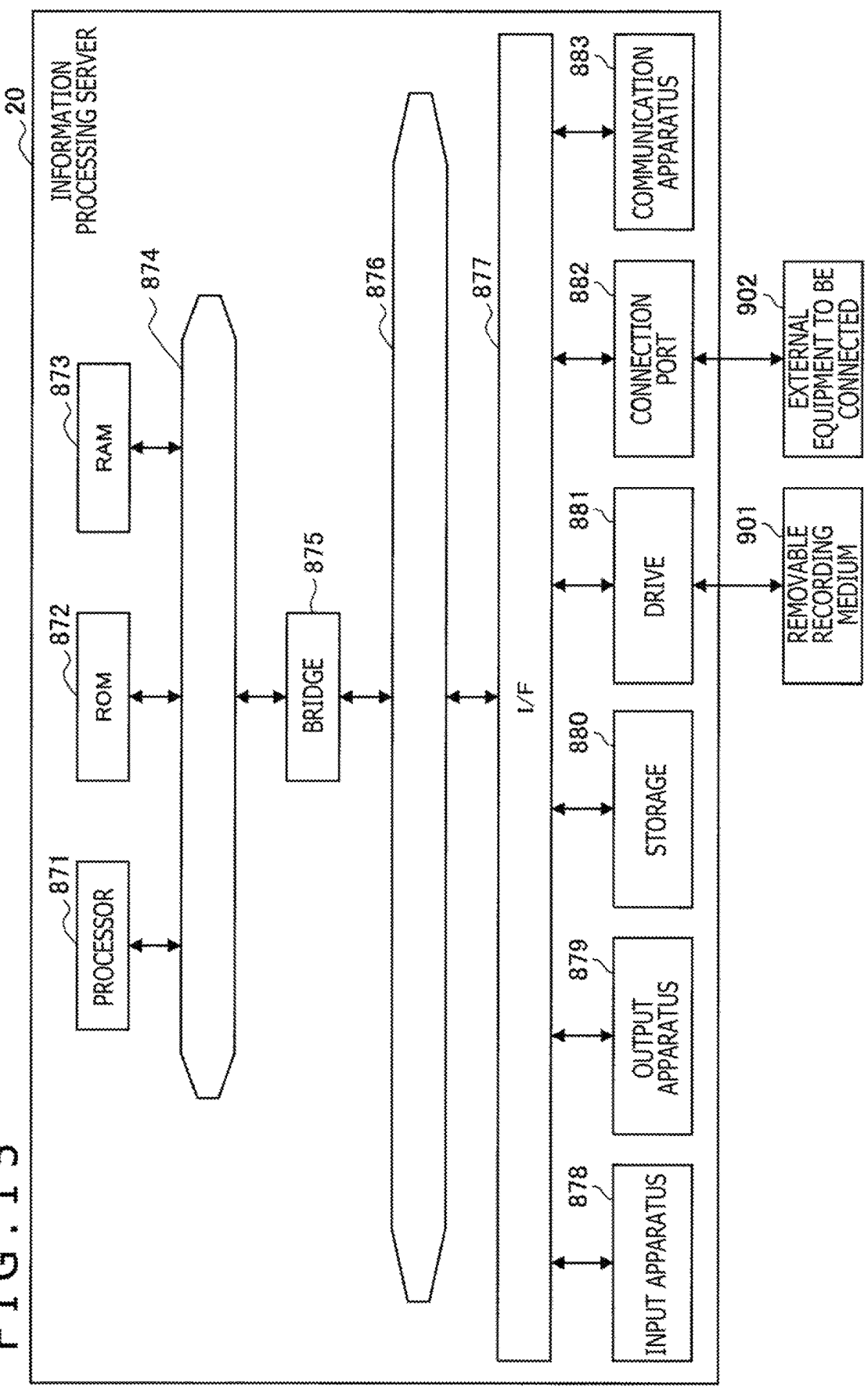
FIG. 15 is a diagram illustrating an example of the hardware configuration of an information processing server according to one embodiment of the present disclosure.

Next, an example of the hardware configuration of the information processing server 20 according to one embodiment of the present disclosure is described. FIG. 15 is a block diagram illustrating an example of the hardware configuration of the information processing server 20 according to one embodiment of the present disclosure. With reference to FIG. 15, the information processing server 20 includes, for example, a processor 871, a ROM 872, a RAM 873, a host bus 874, a bridge 875, an external bus 876, an interface 877, an input apparatus 878, an output apparatus 879, a storage 880, a drive 881, a connection port 882, and a communication apparatus 883. Note that the illustrated hardware configuration is an example, and a part of the components may be omitted. Further, the information processing server 20 may further include components other than the illustrated components.

(Processor 871)

The processor 871 functions as, for example, an arithmetic processing apparatus or a control apparatus, and controls the entire or part of the operation of each component on the basis of various programs recorded on the ROM 872, the RAM 873, the storage 880, or a removable recording medium 901.

(ROM 872 and RAM 873)

The ROM 872 is means for storing, for example, programs to be read by the processor 871 or data for calculation. The RAM 873 temporarily or permanently stores, for example, programs to be read by the processor 871 and various parameters that are changed appropriately in execution of the programs.

(Host Bus 874, Bridge 875, External Bus 876, and Interface 877)

The processor 871, the ROM 872, and the RAM 873 are connected to each other through the host bus 874 enabling high-speed data transmission, for example. Meanwhile, the host bus 874 is connected, through the bridge 875, to the external bus 876 supporting relatively low-speed data transmission, for example. Further, the external bus 876 is connected to various components through the interface 877.

(Input Apparatus 878)

Examples of the input apparatus 878 include mice, keyboards, touch panels, buttons, switches, and levers. In addition, as the input apparatus 878, a remote controller capable of transmitting control signals with the use of infrared radiation or other radio waves is sometimes used. Further, the input apparatus 878 includes a voice input apparatus such as a microphone.

(Output Apparatus 879)

The output apparatus 879 is an apparatus capable of notifying a user of acquired information visually or aurally. Examples of the output apparatus 879 include display apparatus including CRTs (Cathode Ray Tubes), LCDs, and organic ELs, audio output apparatus including speakers, headphones, and the like, printers, cell phones, facsimiles, and the like. Further, the output apparatus 879 according to the present disclosure includes various vibration devices capable of outputting tactile stimulation.

(Storage 880)

The storage 880 is an apparatus which stores various pieces of data. Examples of the storage 880 include magnetic storage devices such as hard disk drives (HDDs), semiconductor storage devices, optical storage devices, and magneto-optical storage devices.

(Drive 881)

The drive 881 is an apparatus which reads out information recorded on the removable recording medium 901, which is a magnetic disk, an optical disc, a magneto-optical disc, or a semiconductor memory, for example, or to write information to the removable recording medium 901.

(Removable Recording Medium 901)

Examples of the removable recording medium 901 include DVD media, Blu-ray (registered trademark) media, HD DVD media, and various semiconductor storage media. As a matter of course, the removable recording medium 901 may be, for example, an IC card having mounted thereon a contactless IC chip or electronic equipment.

(Connection Port 882)

The connection port 882 is a port for connection with external equipment to be connected 902. Examples of the connection port 882 include USB (Universal Serial Bus) ports, IEEE 1394 ports, SCSI (Small Computer System Interface), RS-232C ports, and optical audio terminals.

(External Equipment to Be Connected 902)

Examples of the external equipment to be connected 902 include printers, portable audio players, digital cameras, digital video cameras, and IC recorders.

(Communication Apparatus 883)

The communication apparatus 883 is a communication device for connection with a network. Examples of the communication apparatus 883 include wired or wireless LANs, Bluetooth (registered trademark), communication cards for WUSB (Wireless USB), routers for optical communication, routers for ADSL (Asymmetric Digital Subscriber Line), and modems for various communications.

3. Conclusion

As described above, the information processing server 20 that achieves the information processing method according to one embodiment of the present disclosure includes the current price calculation unit 230 calculating a current price of a target product. Further, the current price calculation unit 230 according to one embodiment of the present disclosure dynamically calculates the current price of the target product on the basis of an assessment rank of the target product determined, and supply/demand information regarding a transaction of a product that belongs to an assessment rank that is the same as the assessment rank of the target product in question and has a product type that is the same as a product type of the target product in question. With such a configuration, a current price of a product can be calculated more objectively and accurately.

The preferred embodiment of the present disclosure is described in detail so far with reference to the attached drawings, but the technical scope of the present disclosure is not limited to the example. It is apparent that various changes or modifications could be arrived at by persons who have ordinary knowledge in the technical field to which the present disclosure belongs within the scope of the technical ideas described in the appended claims, and it is therefore understood that such changes or modifications naturally belong to the technical scope of the present disclosure.

For example, the display control unit 220 according to one embodiment of the present disclosure may correct an assessment rank determined by the assessment unit 210 in response to a request based on, for example, the preference of a buyer, to thereby provide sell order information for each assessment rank that is optimized for each user. With the above-mentioned function of the display control unit 220, for example, to a user who puts emphasis on stylishness rather than functionality, sell order information suitable for the user in question that has been determined from a perspective different from that for an original assessment rank can be presented.

Further, the effects described herein are merely illustrative or exemplary and are not limited. That is, the technology according to the present disclosure may provide other effects that are obvious for persons skilled in the art from the description of the present specification, in addition to the above-mentioned effects or instead of the above-mentioned effects.

Further, a program for enabling hardware built in a computer, such as a CPU, a ROM, or a RAM, to achieve a function equivalent to the configuration of the information processing server 20 can be created. A non-transitory computer-readable recording medium having recorded thereon the program in question can be provided.

Further, the respective steps of the processing by the information processing server 20 described herein are not necessarily performed in chronological order in the order illustrated in the flowchart. For example, the respective steps of the processing by the information processing server 20 may be performed in an order different from the order illustrated in the flowchart or performed in parallel to each other.

Note that the following configurations also belong to the technical scope of the present disclosure.

(1) An information processing apparatus, including:

a current price calculation unit calculating a current price of a target product, in which the current price calculation unit dynamically calculates the current price of the target product on the basis of an assessment rank of the target product determined, and supply/demand information regarding a transaction of a product that belongs to an assessment rank that is same as the assessment rank of the target product and has a product type that is same as a product type of the target product.

(2) The information processing apparatus according to Item (1), in which the supply/demand information includes at least sell order information and buy order information, and the current price calculation unit dynamically calculates at least a current sales price of the target product.

(3) The information processing apparatus according to Item (1) or (2), in which the supply/demand information includes at least rent-out order information and rent order information, and the current price calculation unit dynamically calculates at least a current rental price of the target product.

(4) The information processing apparatus according to Item (1) or (2), in which the current price calculation unit dynamically calculates a current rental price of the target product on the basis of a current sales price of the target product.

(5) The information processing apparatus according to any one of Items (1) to (4), in which the target product includes a product which generates or reproduces content.

(6) The information processing apparatus according to Item (5), in which the product which generates or reproduces content includes at least one of a camera, a lens, a musical instrument, or an audio instrument.

(7) The information processing apparatus according to any one of Items (1) to (6), further including:

an assessment unit determining the assessment rank of the target product.

(8) The information processing apparatus according to Item (7), in which the target product includes at least one of a camera or a lens, and the assessment unit determines the assessment rank of the target product on the basis of an image taken with the target product.

(9) The information processing apparatus according to Item (8), in which the assessment unit specifies the product type of the target product on the basis of meta data included in the image.

(10) The information processing apparatus according to Item (8) or (9), in which the assessment unit determines, with the image being an input, the assessment rank of the target product on the basis of a learned model generated by using a machine learning algorithm.

(11) The information processing apparatus according to Item (7), in which the assessment unit determines the assessment rank of the target product on the basis of an input usage status of the target product.

(12) The information processing apparatus according to any one of Items (1) to (11), further including:

a display control unit controlling a user interface that enables a product transaction for each of the product type and the assessment rank.

(13) The information processing apparatus according to Item (12), in which the display control unit visualizes the supply/demand information by the product type and the assessment rank, and displays the supply/demand information on the user interface.

(14) The information processing apparatus according to Item (13), in which the display control unit visualizes the supply/demand information by a transaction type, and displays the supply/demand information on the user interface.

(15) The information processing apparatus according to Item (13) or (14), in which the display control unit dynamically controls display of the supply/demand information on the basis of an input desired transaction price.

(16) The information processing apparatus according to any one of Items (12) to (15), in which the display control unit dynamically controls display of statistics information regarding a current price of a product that a user has.

(17) An information processing method, including:

calculating, by a processor, a current price of a target product, in which the calculating a current price includes dynamically calculating the current price of the target product on the basis of an assessment rank of the target product determined, and supply/demand information regarding a transaction of a product that belongs to an assessment rank that is same as the assessment rank of the target product and has a product type that is same as a product type of the target product.

(18) A recording medium having recorded thereon a program for causing a computer to function as an information processing apparatus, the information processing apparatus including a current price calculation unit calculating a current price of a target product, in which the current price calculation unit dynamically calculates the current price of the target product on the basis of an assessment rank of the target product determined, and supply/demand information regarding a transaction of a product that belongs to an assessment rank that is same as the assessment rank of the target product and has a product type that is same as a product type of the target product.

REFERENCE SIGNS LIST

10 Information processing terminal
20 Information processing server
210 Assessment unit
220 Display control unit
230 Current price calculation unit
240 Communication unit

The invention claimed is:

1. An information processing apparatus, comprising:
   a current price calculation unit configured to calculate a current price of a target product,
   wherein the current price calculation unit dynamically calculates the current price of the target product on a basis of a determined assessment rank of the target product, and supply/demand information regarding a transaction of a product that belongs to an assessment rank that is same as the assessment rank of the target product and has a product type that is same as a product type of the target product,
   wherein the target product includes a product which generates or reproduces content,
   wherein the target product includes at least one of a camera or a lens, and the assessment rank of the target product is determined on a basis of an image taken with the target product and a learned model generated by using a machine learning algorithm with the image being an input, and
   wherein the current price calculation unit is implemented via at least one processor.

2. The information processing apparatus according to claim 1,
   wherein the supply/demand information includes at least sell order information and buy order information, and
   the current price calculation unit dynamically calculates at least a current sales price of the target product.

3. The information processing apparatus according to claim 1,
   wherein the supply/demand information includes at least rent-out order information and rent order information, and
   the current price calculation unit dynamically calculates at least a current rental price of the target product.

4. The information processing apparatus according to claim 1,
 wherein the current price calculation unit dynamically calculates a current rental price of the target product on a basis of a current sales price of the target product.

5. The information processing apparatus according to claim 1,
 wherein the product which generates or reproduces content includes at least one of a camera, a lens, a musical instrument, or an audio instrument.

6. The information processing apparatus according to claim 1, further comprising:
 an assessment unit configured to determine the assessment rank of the target product,
 wherein the assessment unit is implemented via at least one processor.

7. The information processing apparatus according to claim 6,
 wherein the assessment unit is further configured to specify the product type of the target product on a basis of meta data included in the image.

8. The information processing apparatus according to claim 6,
 wherein the assessment unit determines the assessment rank of the target product on a basis of an input usage status of the target product.

9. The information processing apparatus according to claim 1, further comprising:
 a display control unit controlling a user interface that enables a product transaction for each of the product type and the assessment rank,
 wherein the display control unit is implemented via at least one processor.

10. The information processing apparatus according to claim 9,
 wherein the display control unit visualizes the supply/demand information by the product type and the assessment rank, and displays the supply/demand information on the user interface.

11. The information processing apparatus according to claim 10,
 wherein the display control unit visualizes the supply/demand information by a transaction type, and displays the supply/demand information on the user interface.

12. The information processing apparatus according to claim 10,
 wherein the display control unit dynamically controls display of the supply/demand information on a basis of an input desired transaction price.

13. The information processing apparatus according to claim 9,
 wherein the display control unit dynamically controls display of statistics information regarding a current price of a product that a user has.

14. An information processing method, comprising:
 calculating, by a processor, a current price of a target product,
 wherein the calculating a current price includes dynamically calculating the current price of the target product on a basis of an assessment rank of the target product determined, and supply/demand information regarding a transaction of a product that belongs to an assessment rank that is same as the assessment rank of the target product and has a product type that is same as a product type of the target product,
 wherein the target product includes a product which generates or reproduces content, and
 wherein the target product includes at least one of a camera or a lens, and the assessment rank of the target product is determined on a basis of an image taken with the target product and a learned model generated by using a machine learning algorithm with the image being an input.

15. A non-transitory computer-readable recording medium having recorded thereon a program, which when executed by a computer causes the computer to execute a method, the method comprising
 the information processing apparatus including a current price calculation unit calculating a current price of a target product,
 wherein the current price calculation unit dynamically calculates the current price of the target product on a basis of an assessment rank of the target product determined, and supply/demand information regarding a transaction of a product that belongs to an assessment rank that is same as the assessment rank of the target product and has a product type that is same as a product type of the target product,
 wherein the target product includes a product which generates or reproduces content, and
 wherein the target product includes at least one of a camera or a lens, and the assessment rank of the target product is determined on a basis of an image taken with the target product and a learned model generated by using a machine learning algorithm with the image being an input.

* * * * *